United States Patent [19]

Lansdowne

[11] Patent Number: 5,085,042
[45] Date of Patent: Feb. 4, 1992

[54] SLOPE MOWER WITH REAR DRIVE ASSEMBLY

[75] Inventor: David L. Lansdowne, Hutchinson, Kans.

[73] Assignee: DewEze Manufacturing, Inc., Harper, Kans.

[21] Appl. No.: 645,783

[22] Filed: Jan. 25, 1991

[51] Int. Cl.⁵ .................. A01D 34/06; A01D 34/66
[52] U.S. Cl. ........................... 56/6; 56/15.2; 56/13.6; 56/16.9; 56/DIG. 10; 56/DIG. 22; 280/6.1
[58] Field of Search .......... 56/6, 7, 11.8, 10.8, 56/11.7, 15.2, 14.9, 14.7, 16.7, 16.9, 13.6, 209, DIG. 10, DIG. 22; 280/6.1, 755

[56] References Cited

U.S. PATENT DOCUMENTS

| | | | |
|---|---|---|---|
| 2,750,204 | 6/1956 | Ohrmann . | |
| 2,764,864 | 10/1956 | Kinkead | 56/7 |
| 2,909,342 | 10/1959 | Maltby | 244/103 R |
| 2,933,271 | 4/1960 | Maltby . | |
| 3,402,536 | 9/1968 | Hale et al. | 56/6 |
| 3,670,834 | 6/1972 | Rogers | 180/41 |
| 4,316,356 | 2/1982 | Planeta | 56/16.2 |
| 4,538,400 | 9/1985 | Hottes | 56/11.8 |
| 4,707,971 | 11/1987 | Forpahl et al. | 56/6 |
| 4,916,889 | 4/1990 | Molstad | 56/6 X |
| 4,926,621 | 5/1990 | Torras | 56/6 X |

Primary Examiner—Stephen J. Novosad
Attorney, Agent, or Firm—Litman, McMahon & Brown

[57] ABSTRACT

A riding mower includes a frame, front steering wheel, two rear wheels and two mower blade housings located laterally relative to the frame with blades located within the housings. Telescoping drive shafts extend generally longitudinally from a belt drive mechanism located at a rearward end of the frame to the blade housings to drive each of the blades within the housings. Hydraulic cylinder assemblies and a leveling system are provided to pivot the frame with respect to the rear wheels and about a longitudinal axis in response to changes in slope of the surrounding terrain, maintaining the frame in a generally upright orientation. The telescoping drive shafts extend and retract in response to the angular movement of the frame with respect to the blade housings that remain close to the ground surface.

16 Claims, 2 Drawing Sheets

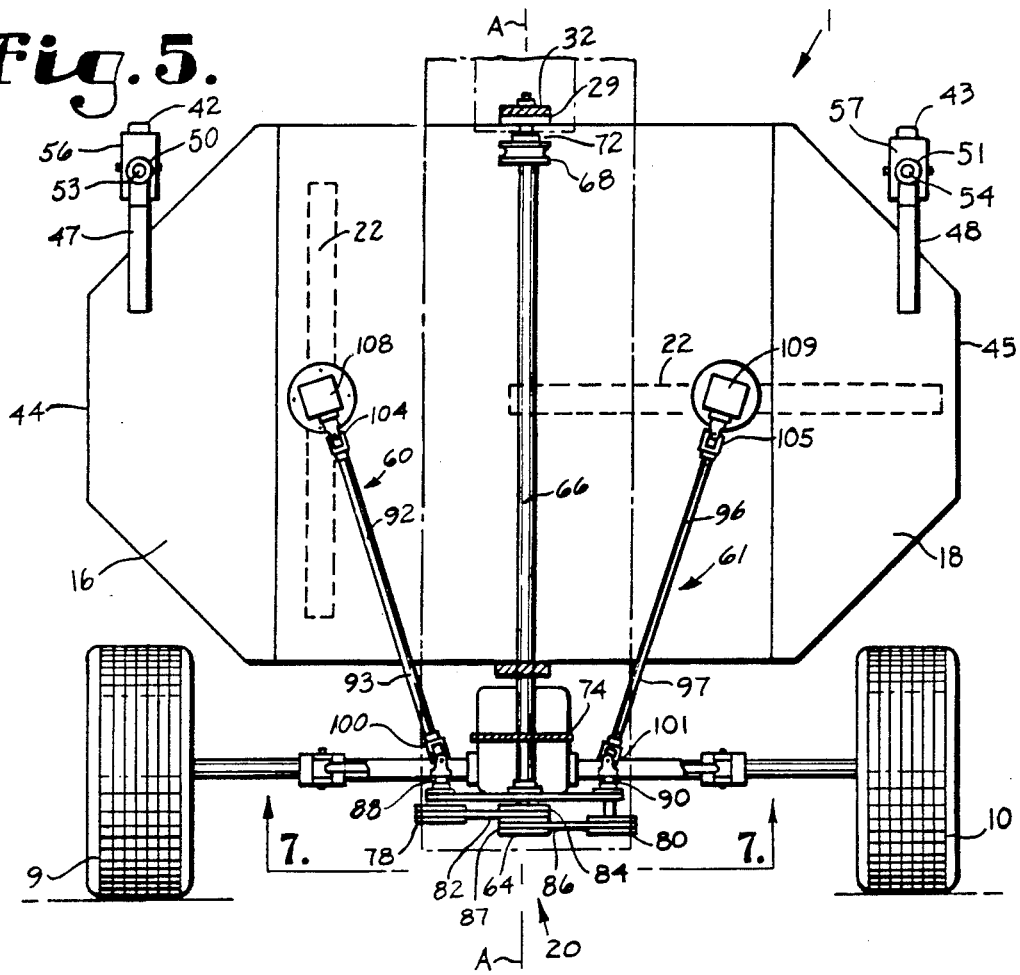
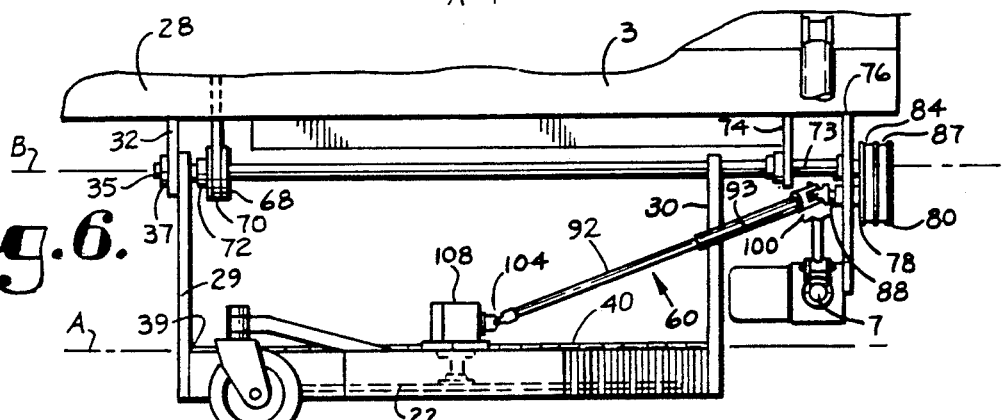
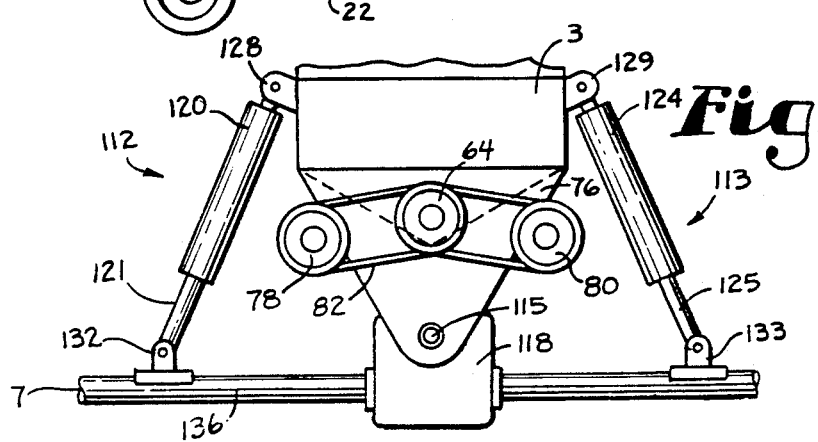

SLOPE MOWER WITH REAR DRIVE ASSEMBLY

BACKGROUND OF THE INVENTION

The present invention relates to mowing vehicles that are responsive to changes in terrain so that the vehicle body is maintained in a generally vertical orientation and, particularly, to a drive assembly for use in connection with such mowers.

Many riding mower designs have been created to eliminate the hazard of vehicle turnover while operating on a sloping terrain. Such mowers often include a frame that is adapted to remain in a generally upright orientation whether the mower is on a hill or flat surface.

Typically, such mowers, often called "slope mowers", include a frame pivotally mounted on either two or three wheels and include blade housings extending laterally from either side of the frame that are also pivotally connected thereto, so that the frame may pivot about a longitudinal axis while the blade housings remain generally parallel and close to the ground surface.

Such a frame and mower arrangement often includes an assembly for driving a rotary blade within each blade housing by connecting the rotary blade to a power source located within the frame. Such an assembly is typically belt-driven or has drive shafts oriented transverse to the frame that extend laterally therefrom to each blade housing. Each drive shaft must be telescoping in nature to respond to angular movement of the frame with respect to each corresponding blade housing. However, because the space between the frame and a blade housing is limited, such a drive shaft is deficient under certain sloping terrain conditions because a shaft short enough to fit within this limited space cannot telescope to the extent necessary to allow the frame to pivot away from the blade housing and thereby remain in a generally vertical position while the housing remains close to the terrain.

SUMMARY O THE INVENTION

A mower of the present invention provides a solution for the spatial limitations of a slope mower by changing the position and alignment of shafts that drive the mower's cutting blades. The slope mower includes a generally elongate frame preferably connected to a single front steering wheel and two rear-driven wheels mounted on a rear axle, with two blade housings centrally supported by and located below the frame and extending laterally therefrom. The blade housings are hingedly attached along a longitudinal axis with each blade housing carrying a driven cutting blade. The blade housings are pivotally attached to the frame at a forward location where the housings are hingedly connected. Each blade housing is also mounted on a laterally-located caster wheel.

A main drive shaft extends longitudinally beneath the frame and above the blade housings and engages an internal combustion engine at a forward end thereof and the rear axle at a rearward location thereof. Additionally, the main drive shaft projects beyond a rear end of the frame where it connects, by lateral belt drives, to longitudinally-directed, telescoping-blade drive shafts that extend forwardly and engage respective right angle gear drives on each blade housing.

The vehicle is adapted to maintain the frame in a generally upright orientation. Hydraulic cylinder and piston rod arrangements connect the frame with the rear wheel axle and a leveling system is provided for sensing changes in attitude of the vehicle frame, actuating the hydraulic cylinder arrangements to maintain the vehicle frame in a generally upright position. As the frame pivots with respect to the rear axle, the blade housings remain close to the ground surface. The telescoping mower blade drive shafts are of a length adequate to extend and retract in response to the sometimes wide angular motion of the frame with respect to the blade housings as the mower is driven along sloping terrain. Furthermore, the longitudinal orientation of the drive shafts requires less telescoping than would be required by drive shafts oriented transverse to the frame.

OBJECTS AND ADVANTAGES OF THE INVENTION

The principal objects of the present invention are: to provide a mower vehicle for mowing sloping hillsides; to provide such a vehicle which maintains the vehicle frame and, accordingly, the operator, in a generally vertical or upright orientation; to provide such a vehicle which may include either a single front and two rear wheels or a single front and single rear wheel; to provide such a vehicle which has dual blade housings centered on an axis extending longitudinally of the frame and pivotally connected thereto; to provide such a vehicle that includes mower drive shafts for driving mower blades located within the blade housings that are adapted to telescope to respond to the angular motion of the vehicle with respect to the blade housings when the vehicle is utilized on sloping terrain; to provide such a vehicle that includes mower drive shafts that do not interfere with other working parts of the mower; to provide such a vehicle which has generally longitudinally-oriented telescoping drive shafts for driving mower blades located within the blade housings; to provide such a vehicle wherein the telescoping drive shafts are driven by a drive mechanism located at a rear end of the vehicle; to provide such a vehicle wherein both the rear wheel or wheels and the mower drive shafts are driven by a single main drive shaft; to provide such a vehicle wherein the telescoping drive shafts are driven by a belt drive connected to a single main drive shaft; to provide such a vehicle which is relatively simple to use, economical to manufacture, and particularly well adapted to the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 5 is an enlarged and fragmentary, cross-sectional view of the slope mower, taken along line 5—5 of FIG. 2.

FIG. 6 is an enlarged and fragmentary, side elevational view of the slope mower.

FIG. 7 is an enlarged and fragmentary, rear elevational view of the slope mower, taken along 7—7 of FIG. 5.

DETAILED DESCRIPTION OF THE INVENTION

Figure 1:
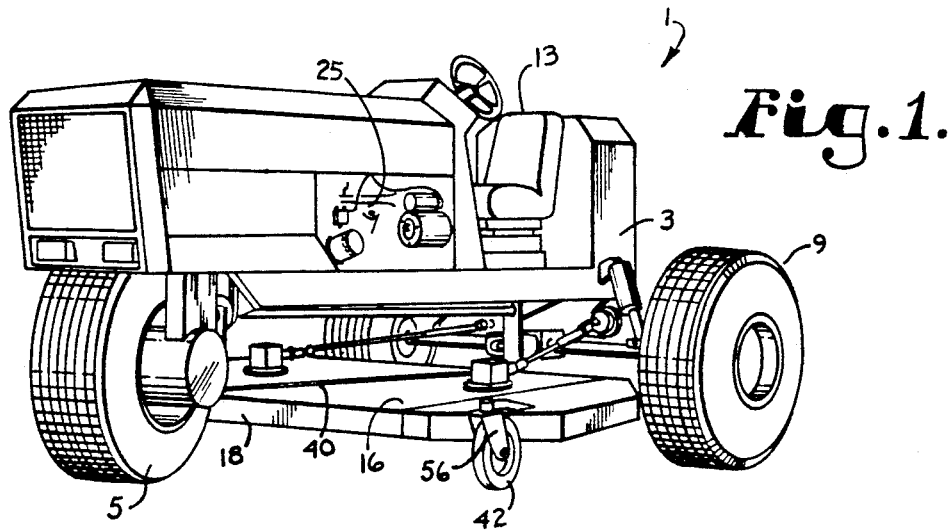
FIG. 1 is a front perspective view of a slope mower of the present invention.
Figure 2:
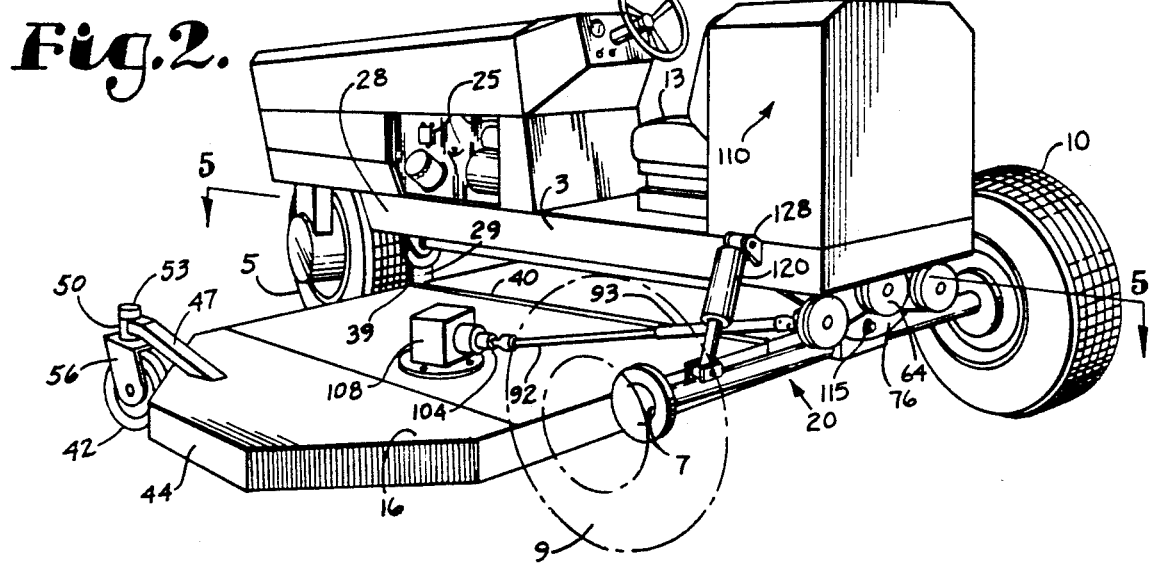
FIG. 2 is a rear perspective view of the slope mower.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, reference numeral 1 refers to a slope mower of the present invention including a generally elongate frame 3, a front wheel 5, a rear wheel axle 7 connecting two rear wheels 9 and 10, an operator seat 13, a first blade housing 16, a second blade housing 18, and a rear drive assembly 20 for driving cutting means such as a blade 22 located within each of the blade housings 16 and 18. The mower 1 includes power means or a prime mover, such as illustrated by an internal combustion engine 25, mounted on the frame 3 and connected to wheel means, such as illustrated by at least the rear wheel axle 7, and preferably to the front wheel 5 and the rear wheel axle 7 for powered movement of the wheels 5, 9 and 10 across the ground. It is foreseen that a mower according to the present invention may be of two-wheel construction such as illustrated by U.S. Pat. No. 4,707,971.

Mowing means, as illustrated by the mower blade 22 rotatably mounted within the blade housing 16 and as illustrated by mower blade 22 rotatably mounted within the blade housing 18, are pivotally connected to a forward portion 28 of the frame 3 by a front support member 29 and a rear support member 30. As shown in FIG. 6, a rigid mounting support 32 is fixedly attached to the forward portion 28 and extends downwardly and generally vertically therefrom. A support rod 35 extends through and is pivotally received in the mounting support 32 and is oriented perpendicular thereto. The support rod 35 also extends through and is pivotally received in the support member 29 with the support member 29 rotatable about the support rod 35. The support rod 35 is secured to the mounting support 32 by a keeper 37. The rear support member 29 is fixedly attached to a forward end 39 of a hinge 40 that pivotally attaches the blade housing 16 and the blade housing 18.

A first or central longitudinal axis, identified by the reference letter A in FIG. 5, extends through a center of the hinge 40 and generally divides the slope mower 1 into first and second, or left and right, sections that are generally equal. The terms "left" and "right" are used in their normal context when looking toward the front of the mower 1. The blade housings 16 and 18 are swingable about the longitudinal axis A and the hinge 40.

The frame 3 and the blade housings 16 and 18 are made from metal or other structurally supportive material. The first and second blade housings 16 and 18 are also equipped with first and second caster wheels 42 and 43 respectively that extend forwardly therefrom and are generally placed near outer lateral edges 44 and 45 respectively. First and second linkage arms 47 and 48 connect the first and second caster wheels 42 and 43 respectively to the associated blade housings 16 and 18. The linkage arms 47 and 48 are fixedly attached at one end thereof to respective first and second blade housings 16 and 17 and fixedly attached to a bearing 50 and a bearing 51 respectively at the other end thereof. The bearings 50 and 51 are rotatably mounted on pintles 53 and 54 respectively that are fixedly attached to forked wheel housings 56 and 57 respectively. The caster wheels 42 and 43 are rotatably mounted within wheel housings 56 and 57 respectively. The caster wheels 42 and 43 are adapted for supporting the blade housings 16 and 18 and keep the periphery of the housings 16 and 18 a set distance from the ground, preventing scalping of the ground when a slope or embankment is encountered by the mower 1.

In order to power-rotate or drive the cutting blades 22, mower drive means, such as the rear drive assembly 20 connected to extensible or telescoping mower drive shafts 60 and 61, are provided. The rear drive assembly 20 includes a centrally-located, dual sheave pulley 64 fixedly attached to an elongate main drive shaft 66 rotatably mounted to, and located beneath, the frame 3 and positioned longitudinally with respect thereto and being rotatable about an axis of rotation identified by the reference letter B. A pulley 68 is fixedly attached to the main drive shaft 66 at a location below the front portion 28 of the frame 3. A drive belt 70 surrounds the pulley 68 and the engine 25 so as to rotate the shaft 66. A collar 72 is also fixedly attached to the pulley 68 and is rotatably mounted on the support rod 35, thereby supporting a forward portion of the main drive shaft 66. The main drive shaft 66 is also rotatably mounted relative to the frame 3 at a rear portion 73 by a support bracket 74 and a frame end support plate 76. The rear portion 73 extends rearwardly behind the end support plate 76 of the frame 3.

The dual sheave pulley 64 is located behind the support plate 76 and extends slightly rearwardly therefrom. First and second drive pulleys 78 and 80 are rotatably mounted on the support plate 76 and ar located adjacent to and laterally from the dual sheave pulley 64. A drive belt 82 engages the pulley 78 and a sheave 84 of the pulley 64. A drive belt 86 engages the pulley 80 and a second sheave 87 of the pulley 64. The pulleys 78 and 80 are fixedly mounted on the shafts 88 and 90 respectively, that are rotatably mounted on the support plate 76, and engage telescoping drive shafts 60 and 61 respectively at a location forward of the support plate 76. As the dual sheave pulley 64 rotates due to translation of rotational movement from the main drive shaft 66, the belts 82 and 86 respectively engage the pulleys 78 and 80 respectively and thereby rotate the shafts 88 and 90 respectively.

The drive shaft 60 includes a shank portion 92 slidingly mounted within a barrel portion 93. The drive shaft 61 includes a shank portion 96 slidingly mounted within a barrel portion 97. The barrel portions 93 and 97 are operatively and pivotally connected by universal joints 100 and 101 to the shafts 88 and 90 respectively. The shank portions 92 and 96 are operatively and pivotally connected by universal joints 104 and 105 respectively to right angle drive units 108 and 109 respectively that are connected to the cutting blades 22 located within the blade housings 16 and 18 respectively. Rotational movement of the pulleys 78 and 80 is thus translated to the drive shafts 60 and 6 respectively and further translated to the drive units 108 and 109 respectively, rotating the blades 22.

The frame 3 is maintained in a generally upright position by level control means such as a hydraulic leveling mechanism and system 110, as is more fully described in U.S. Pat. No. 4,707,971 which is incorporated herein by reference, that operatively connects to a first and a second hydraulic assembly 112 and 113. The leveling system 110 senses changes in the attitude or vertical orientation of the frame 3 and selectively actuates one or both of the hydraulic assemblies 112 and 113 to pivot the frame 3 with respect to the rear axle 7 about a pivot pin 115 that is fixedly attached to a gear box 118 that is mounted on the rear axle 7. The support plate 76 that is fixedly attached to the frame 3 is rotatably mounted on the pivot pin 115. The frame 3 pivots with respect to a second, centrally-located, longitudinal axis running through the center of the pivot pin 115 that is parallel to axis A.

Pivoting means for maintaining the frame 3 in a generally upright or vertical position, as is illustrated by hydraulic assemblies 112 and 113, each include a first, or left, leveling cylinder 120 with a connecting piston rod 12 and a second, Or right, leveling cylinder 124 with a connecting piston rod 125. As is illustrated by FIG. 7, the 16 cylinders 120 and 124 are pivotally connected to support ears 128 and 129 respectively that are fixedly attached to the frame 3. The piston rods 121 and 125 are pivotally connected to support braces 132 and 133 respectively. The support braces 132 and 133 are fixedly attached to an axle sleeve 136 that surrounds the rear axle 7, with the rear axle 7 being freely rotatable therewithin.

Figure 3:
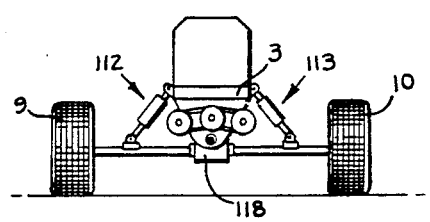
FIG. 3 is a reduced and partially schematic, rear elevational view of a tractor portion of the slope mower, shown on level terrain.
Figure 4:
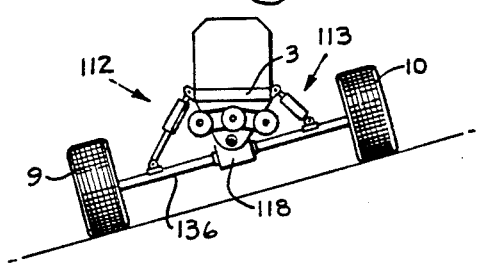
FIG. 4 is a reduced and partially schematic, rear elevational view of the slope mower, showing one adaptation of the tractor of the mower to inclined terrain.

In operation, an operator (not shown) is seated on the operator seat 13 fixedly mounted to the frame 3. As the operator drives the mower 1 and engages the mower blades 22, the leveling system 110 is responsive to various slopes that are encountered, as is schematically shown in FIGS. 3 and 4. When a sloping terrain is encountered, the hydraulic assemblies 112 and 113 pivot the frame 3 and the operator seat 13 with respect to the rear axle 7, keeping the frame 3 in a generally vertical orientation. As the frame 3 pivots with respect to the axle 7, the frame 3 also pivots with respect to the blade housings 16 and 18. The telescoping drive shafts 60 and 61 automatically respond to the pivoting of the frame 3 and extend or contract with respect to the rear drive assembly 20 and the blade housings 16 and 18 respectively. The blade housings 16 and 18 follow the terrain, while the frame 3 pivots with respect thereto.

Due to the longitudinal orientation of the telescoping shafts 60 and 61, only relatively slight extensions or retractions are required even on sharply sloping terrain that requires substantial extension of either of the hydraulic assemblies 112 Or 113. Furthermore, the rearward location of the drive assembly 20 allows for easy maintenance and drive belt replacement.

It is to be understood that while certain forms of the present invention have been illustrated and described herein, it is not to be limited to the specific forms or arrangement of parts described and shown.

What is claimed and desired to be secured by Letters Patent is as follows:

1. A mower vehicle comprising:
   (a) a frame having front and rear ends;
   (b) wheel means connected to aid frame;
   (c) a main drive shaft having an end portion; said shaft rottatably mounted to said frame, operably driving said wheel means and positioned longitudinally with respect to said frame; said shaft end portion located near said frame rear end;
   (d) power means mounted on aid frame engaging and operably driving said main shaft drive;
   (e) mowing means connected to said frame and extending laterally therefrom;
   (f) mower drive means adjacent to and operably rotated by said shaft end portion;
   (g) a mower drive shaft rotated by said mower drive means and rotating said mowing means;
   (h) said frame is pivotally connected to said wheel means and has a generally vertical orientation when in operation; and
   (i) said mowing means includes a blade housing and a cutting blade mounted within id housing; said housing is pivotally connected to said frame an swingable about a first axis extending longitudinally relative to said frame.

2. The mower vehicle according to claim 1 including:
   (a) pivoting means for pivoting said frame with respect to said wheel means and with respect to said blade housing in automatic response to a change in terrain, thereby allowing said blade housing to follow the terrain while said frame remains in the vertical orientation thereof.

3. The mower vehicle according to claim 2 wherein:
   (a) said frame pivots about a second longitudinal axis parallel to said first axis.

4. The mower vehicle according to claim 2 wherein:
   (a) said blade housing is a first blade housing and said cutting blade is a first cutting blade; and including:
   (b) a second blade housing being pivotally connected to said frame on an opposite side of said frame relative to s id first blade housing; said second blade housing being swingable about said first axis; and
   (c) a second cutting blade mounted within said second blade housing.

5. The mower vehicle according to claim 4 wherein:
   (a) said mower drive means is a rear drive assembly including:
      (1) a dual sheave pulley fixedly attached to said main drive shaft;
      (2) first and second lateral pulleys mounted on said frame and adjacent to said dual sheave pulley;
      (3) a first drive belt connecting said dual sheave pulley and said first lateral pulley;
      (4) a second drive belt connecting said dual sheave pulley and said second lateral pulley; and
   (b) said mower drive shaft is a first telescoping mower drive shaft connected to said first lateral pulley; and including
   (c) a second telescoping mower drive shaft connected to said second lateral pulley.

6. The mower vehicle according to claim 5 wherein:
   (a) said first telescoping mower drive shaft is pivotally connected to said first blade housing and operatively connected to said first cutting blade; and
   (b) said second telescoping mower drive shaft is pivotally connected to said second blade housing and operatively connected to said second cutting blade.

7. The mower vehicle according to claim 2 wherein:

(a) said wheel means includes a front steering wheel and first and second rear drive wheels mounted on a rear axle; and (b) said pivoting means includes first and second hydraulic assemblies pivotally connected to said frame and pivotally connected to said rear axle.

8. A mower vehicle comprising:

(a) a mower frame having a rear end;

(b) front and rear wheel means connected to said frame;

(c) a main drive shaft having a rear portion; said shaft extending longitudinally beneath said frame and cooperating to operably drive said rear wheel means; said rear portion passing through said rear end;

(d) power means mounted on said frame and connected to said drive shaft so as to operably drive said shaft;

(e) a blade housing pivotally connected to said frame and swingable about a first axis extending longitudinally relative to said frame;

(f) cutting means mounted in said blade housing;

(g) drive means connected to said rear portion so as to be operably driven by said shaft; and (h) a telescoping drive shaft operatively connected to said cutting means and pivotally attached to said blade housing at one end thereof and operatively connected to said drive means at the other end thereof so as to be operably driven by said power means through said drive means.

9. The mower vehicle according to claim 8 wherein:

(a) said frame is pivotally connected to said rear wheel means and has a generally vertical orientation when in operation.

10. The mower vehicle according to claim 9 including:

(a) pivoting means for pivoting said frame with respect to said rear wheel means and with respect to said blade housing in automatic response to a change in inclination of terrain being traversed by said vehicle, thereby allowing said blade housing to follow the terrain while said frame remains in the vertical orientation thereof.

11. The mower vehicle according to claim 10 wherein:

(a) said frame pivots about a second longitudinal axis parallel to s id first axis.

12. The mower vehicle according to claim 10 wherein:

(a) said blade housing is a first blade housing and said cutting mean is a first cutting blade; and including:

(b) a second blade housing being pivotally connected to said frame on an opposite side of said frame relative to said first blade housing; said second blade housing being swingable about said first axis; and (c) a second cutting blade mounted within said second blade housing.

13. The mower vehicle according to claim 12 wherein:

(a) said pivoting means includes first and second hydraulic assemblies pivotally connected to said frame and pivotally connected to said rear wheel means.

14. The mower vehicle according to claim 12 wherein:

(a) said drive means is a rear drive assembly including:

(1) a dual sheave pulley fixedly attached to said main drive shaft;

(2) first and second lateral pulleys mounted on said frame and adjacent to said dual sheave pulley;

(3) a first belt operably connecting said dual sheave pulley and said first lateral pulley;

(4) a second belt operably connecting said dual sheave pulley and said second lateral pulley; and (b) said telescoping drive shaft is a first telescoping mower drive shaft connected to said first lateral pulley; and (c) a second telescoping mower drive shaft is connected to said second lateral pulley.

15. The mower vehicle according to claim 14 wherein:

(a) said first telescoping mower drive shaft is pivotally connected to said first blade housing and operatively connected to said first cutting blade; said first telescoping mower drive shaft extending and contracting a said frame pivots with respect to said first blade housing; and (b) said second telescoping mower drive shaft is pivotally connected to said second blade housing and operatively connected to said second cutting blade; said second telescoping mower drive shaft extending and contracting as said frame pivots with respect to said second blade housing.

16. A mower vehicle comprising:

(a) a mower frame having a rear end;

(b) a front steering wheel;

(c) first and second rear drive wheels mounted on a rear axle; said mower frame pivotally mounted on said rear axle and connected to said front steering wheel;

(d) a main drive shaft having a rear portion; said shaft extending longitudinally beneath said frame and engaging said rear axle; said rear portion extending rearwardly near said rear end;

(e) a prime mover mounted on said frame operably driving said drive shaft;

(f) a first blade housing pivotally connected to said frame and swingable about a first axis extending longitudinally relative to said frame (g) a first cutting blade rotatably mounted within said first blade housing;

(h) a second blade housing pivotally connected to said frame on an opposite side of said frame relative to said first blade housing; said second blade housing being swingable about said first axis;

(i) a second cutting blade mounted within said second blade housing;

(j) pivoting means for selectively pivoting said frame with respect to said rear wheel axle and with respect to said first and second blade housings in automatic response to a change in inclination of terrain be traversed thereby so as to allow said blade housings to follow the terrain while said frame remains in the vertical orientation thereof; said frame pivoting about a second longitudinal axis parallel to said first axis; said pivoting means include:

(1) first and second hydraulic assemblies pivotally connected to said frame and pivotally connected to said rear axle;

(k) a rear drive assembly including:

(1) a dual sheave pulley fixedly attached to said rear portion of said main drive shaft and rotatably mounted on said frame;

(2) first and second lateral pulleys mounted on said frame and adjacent to said dual sheave pulley;
(3) a first belt operably connecting said dual sheave pulley and said first lateral pulley;
(4) a second belt operably connecting said dual sheave pulley and said second lateral pulley;

(l) a first telescoping mower drive shaft operatively connected to said first lateral pulley at one end thereof and operatively connected to said first cutting blade at the other end thereof; said first telescoping mower drive shaft extending and contracting a said frame pivots with respect to said first blade housing; and (m) a second telescoping mower drive shaft operatively connected to said second lateral pulley at one end thereof and operatively connected to said second cutting blade at the other end thereof; said second telescoping mower drive shaft extending and contracting as said frame pivots with respect to said second blade housing.

* * * * *

UNITED STATES PATENT AND TRADEMARK OFFICE
CERTIFICATE OF CORRECTION

PATENT NO. : 5,085,042
DATED : February 4, 1992
INVENTOR(S) : David L. Lansdowne It is certified that error appears in the above-identified patent and that said Letters Patent is hereby corrected as shown below:

Claim 1, paragraph b, delete "aid" and insert --said--;
paragraph d, line 1, delete "aid" and insert --said;
paragraph i, line 2, delete "id" and insert --said--; line 3, delete "an" and insert --and--;

Claim 4, paragraph b, line 3, delete "s id" and insert --said--;

Claim 11, paragraph a, line 2, delete "s id" and insert --said--.

Signed and Sealed this

Thirty-first Day of May, 1994

Attest:

BRUCE LEHMAN

Attesting Officer  Commissioner of Patents and Trademarks